*INVENTORS*
*TOME KITAGUCHI*
*WILLIAM GRIFF*

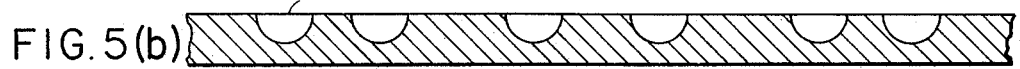
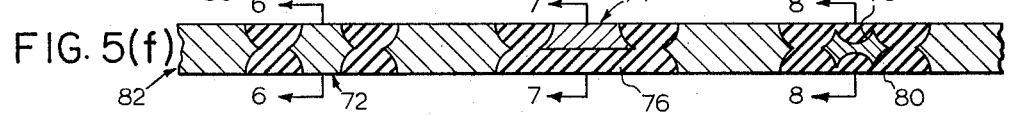
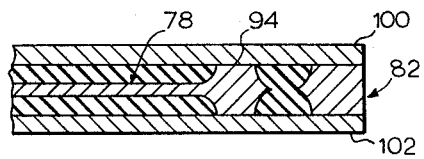
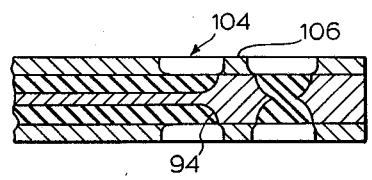
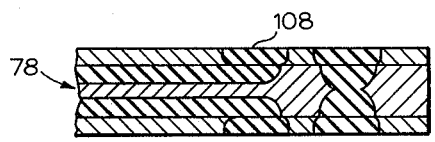

United States Patent Office 3,499,219
Patented Mar. 10, 1970

3,499,219
INTERCONNECTION MEANS AND METHOD OF FABRICATION THEREOF
William Griff, Tarzana, and Tome Kitaguchi, Northridge, Calif., assignors to The Bunker-Ramo Corporation, Canoga Park, Calif., a corporation of Delaware
Filed Nov. 6, 1967, Ser. No. 680,913
Int. Cl. H01b 13/06; H05k 3/20
U.S. Cl. 29—624    6 Claims

ABSTRACT OF THE DISCLOSURE

An electrical interconnection structure and a method of fabrication thereof. The structure is comprised of a stack of one or more electrically conductive plates. Openings extending through the plate end elongated in the plane of the plate contain dielectric material supporting an elongated conductive island. The island is preferably formed from the plate by removing portions of the plate forming a channel enclosing the island. The dielectric material electrically isolates the island from the remaining portions of the plate. Adjacent conductive layers shield the island to thus effectively form a coaxial transmission line.

BACKGROUND OF THE INVENTION

Field of the invention

This invention relates generally to electrical interconnection means and a method of fabrication thereof and more particularly to means useful for interconnecting micro-miniaturized high speed electronic circuits.

As the switching and clock rates of various systems, such as digital data processing systems, are increased, the characteristics of the circuit interconnection means employed in such systems becomes significant. That is, whereas the characteristics of the interconnection means are of little importance when used with relatively low frequency signals, they can have a pronounced effect on the system performance when the transient durations (rise and fall times) of the signals become a significant fraction of the time required to propagate the signals between circuits or components. Additionally, system performance is greatly effected when signal propagation time between circuits is not negligible in comparison with the system clock period. Thus, where the transient durations become greater than 5 to 10% of the signal propagation time between circuits via the interconnecting means, the interconnecting means should be regarded as a distributed circuit element and therefore should be considered as an integral part of the circuitry itself if accurate and predictable results are to be achieved. Therefore, where the signal propagation time is significant, the interconnection means should be viewed as a transmission line and transmission line theory should be applied to achieve proper circuit and system designs.

Recognizing that the interconnection means should be considered as a transmission line, it follows that the line should be uniform and properly terminated with respect to impedance if signal reflections and resulting distortions are to be prevented. That is, if the physical and electrical properties of the interconnection means are not uniform, then the non-uniformities (gradual or abrupt) appear as changes in the characteristic impedance resulting in signal reflections. Such reflections can have a detrimental effect on circuit performance by for example, resulting in triggering delays. When interconnection propagation time becomes comparable to the clock period, reflections become especially troublesome because the reflected signal, if not sufficiently attenuated, can spill over into the logic allocation for the next clock period, thus causing circuit malfunctions.

In addition to signal distortion problems resulting from signal reflections, cross-talk problems resulting from coupling between adjacent circuits become significant in high speed circuitry because of the rates of change in the electric and magnetic fields during transients. These problems can of course become of special importance when high interconnection densities are desired for compatibility with micro-miniature circuits.

Description of the prior art

In view of the foregoing considerations, various attempts have been made in the prior art to develop techniques for interconnecting high-speed circuits, and more particularly high speed micro-miniaturized circuits. Some of these early techniques are discussed in U.S. Patent No. 3,351,816, which discloses an improved means for interconnecting high-speed circuits. More particularly, the cited patent discloses an interconnection technique which involves providing planar coaxial interconnections between component circuits. The interconnection means, according to a preferred embodiment of the invention disclosed therein, is fabricated by forming troughs in opposed faces of conductive ground plates formed of aluminum or copper for example. A dielectric such as epoxy is deposited in the opposed troughs and a conductor is formed on the surface of the epoxy between the troughs. A conductive material bonds the opposed surfaces of the plates and a dielectric material bonds the opposed epoxy surfaces in the troughs. The two plates are laminated together as by the application of heat and pressure. The resulting structure provides uniform self-shielded transmission lines well suited for the contemplated applications. In addition, a continuous range of characteristic impedances can be obtained as a function of the geometry of the trough and the width of the conductors. This provides a great advantage over an interconnection approach using miniature coaxial cable where only a few discrete values of impedance are available. High interconnection densities with negligible cross-talk can be achieved making this approach compatible with packaging densities afforded by integrated circuits. The high packaging densities in turn will enable minimization of propagation time within the system. The conductive plates also assure that the interconnection structure has excellent heat dissipation characteristics.

U.S. Patents Nos. 3,351,953 and 3,351,702 respectively disclose alternative interconnection structures which yield substantially the same functional advantages as are provided by the structure of U.S. Patent No. 3,351,816.

SUMMARY OF THE INVENTION

The present invention is directed to a further interconnection structure and method of fabrication thereof and is based on the recognition that interconnections between points lying in a common plane defined by a conductive plate can be formed by electrically isolating elongated portions of the plate from the remaining portions of the plate.

More particularly, in order to form conductors in a single plane, a conductive plate can initially be etched from a first surface thereof to form an endless trough of channel surrounding an elongated conductive area on that surface. The trough can then be filled with a dielectric material and the plate can then be etched from a second surface to form a second trough which extends into the plate to meet the trough from the first surface. The second trough can then be filled with dielectric material to thus leave a conductive island electrically insulated from the remainder of the plate by the dielectric material. This elongated island can serve as the central conductor of a coaxial transmission line inasmuch as it can subsequently be enveloped by a ground plane comprised of the remainder of the plate from which it was formed and upper and lower conductive layers bonded thereto.

A central conductor having a wide range of width and thickness dimensions can be fabricated in accordance with the present invention. Thus, the conductor can have surfaces which are either aligned with the surfaces of the plate from which it is formed or recessed with respect thereto. More particularly, if the conductor is to be electrically connected to an immediately adjacent conductive layer in the finished stack assembly, its surface is preferably formed in alignment with the surface of the plate from which it is formed. In this manner, electrical contact can automatically be established between the conductor and the adjacent layer in the course of assembling the stack. On the other hand, by recessing the conductor surfaces, the conductor can automatically be electrically spaced and insulated from an adjacent layer.

The invention will best be understood from the following description when read in conjunction with the accompanying drawings in which.

FIGS. 5(a)-(f) illustrate schematic sectional views describing a preferred fabrication method in accordance with the present invention.

FIG. 6 is a vertical sectional view taken substantially along the plane 6—6 of FIG. 5(f);

FIG. 7 is a vertical sectional view taken substantially along the plane 7—7 of FIG. 5(f);

FIG. 8 is a vertical sectional view taken substantially along the plane 8—8 of FIG. 5(f); and FIGS. 9(a)-(c) illustrate additional fabrication steps in accordance with further aspects of the invention for fabricating a single plane coaxial transmission line.

Figure 1:
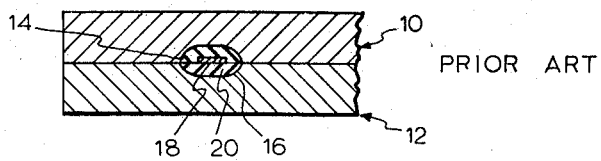
FIGURE 1 is a fragmentary sectional diagram illustrating a prior art planar coaxial transmission line.

Attention is now called to FIG. 1 which illustrates a cross-sectional view of a planar coaxial transmission line of the type generally disclosed by the aforecited patents. More particularly, the structure of FIG. 1 includes a first flat conductive plate 10 and a second flat conductive plate 12 disposed in superposed relationship so that the bottom surface of plate 10 is opposed to the top surface of plate 12. A first trough 14 extends into the plate 10 from the bottom surface thereof and a second trough 16 extends into the plate 12 from the top surface thereof. The troughs 14 and 16 are aligned and a central conductor 18 is disposed therebetween. The conductor 18 is substantially completely enveloped by the plates 10 and 12 which are electrically interconnected to form a ground plane. Thus, the conductor 18 in conjunction with the plates 10 and 12 forms an effective coaxial transmission line as disclosed in greater detail in the aforecited patents. The conductor 18 can be supported in the troughs 14 and 16 and electrically insulated from the plates 10 and 12 by dielectric material 20, for example, such as epoxy. As is further disclosed in the aforecited patents, the plates 10 and 12 are intended to be employed in a stack of several plates which together can carry complex interconnection means for interconnecting high speed electronic circuits. The conductor 18 is intended to connect two spaced points in a single plane and is thus referred to as an in-plane connector. The conductor 18 can be connected to an in-line conductor between two different plates by a through-plane connector (not shown in FIG. 1) which penetrates through a plate but is electrically insulated therefrom. The through-plane connector can comprise a plated through hole, for example, as shown in the aforecited patents.

Figure 2A:
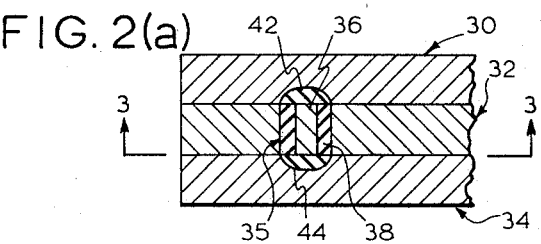
FIG. 2(a) is a fragmentary sectional view illustrating an exemplary planar coaxial transmission line embodiment in accordance with the present invention.
Figure 2B:
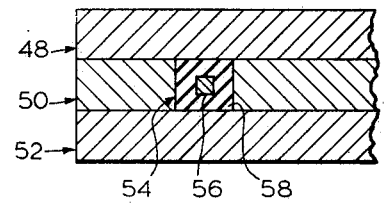
FIG. 2(b) is a fragmentary sectional view illustrating a further exemplary planar coaxial transmission line embodiment in accordance with the present invention.

FIGS. 2(a) and 2(b) respectively illustrate circuit structures in accordance with the present invention for defining interconnection means substantially functionally equivalent to the interconnection means shown in FIG. 1. More particularly, the structure of FIG. 2(a) employs at least three conductive plates respectively identified as 30, 32 and 34. The plates 30 and 34 sandwich plate 32 therebetween and are electrically connected thereto as at the boundaries therebetween or by some other means such as internally plated holes which penetrate all three layers.

In accordance with the present invention, an opening 35 is formed extending through the central plate 32 and elongated in the plane of the plate. A conductor 36 is supported in the opening 35, as by dielectric material 38 which electrically insulates the conductor from the plate.

It will be noted in FIG. 2(a) that the upper and lower surfaces of the conductor 36 are respectively substantially in alignment with the upper and lower surfaces of plate 32. Thus, in order to prevent electrical contact between the surfaces of conductor 36 and the surfaces of plates 30 and 34, troughs 42 and 44 are respectively formed in plates 30 and 34. The throughs 42 and 44 can be filled with dielectric material which insulate the conductor 36 from the plates. Thus, it should be appreciated that the structure of FIG. 2(a) will yield a device which is electrically substantially equivalent to that shown in FIG. 1.

FIG. 2(b) illustrates an alternative structure in accordance with the present invention which eliminates the need for forming troughs in the upper and lower plates. More particularly, the structure of FIG. 2(b) illustrates plates 48, 50 and 52 supported in stacked or superposed relationship. The plate 50 defines an opening 54 extending therethrough and elongated in the plane of plate 50. A central conductor 56 is supported in the opening by a dielectric material 58. The conductor 56 shown in FIG. 2(b) differs from the conductor 36 of FIG. 2(a) in that its thickness has been reduced so that the upper and lower surfaces thereof are effectively recessed with respect to the upper and lower surfaces of the plate 50. That is, both the upper and lower surfaces of the conductor 56 lie between the planes defined by the upper and lower surfaces of the plate 50. As a consequence, the dielectric material 58 not only insulates the conductor 56 from the remainder of plate 50, but in addition envelops the conductor 56 to insulate it from the plates 48 and 52.

Figure 3:
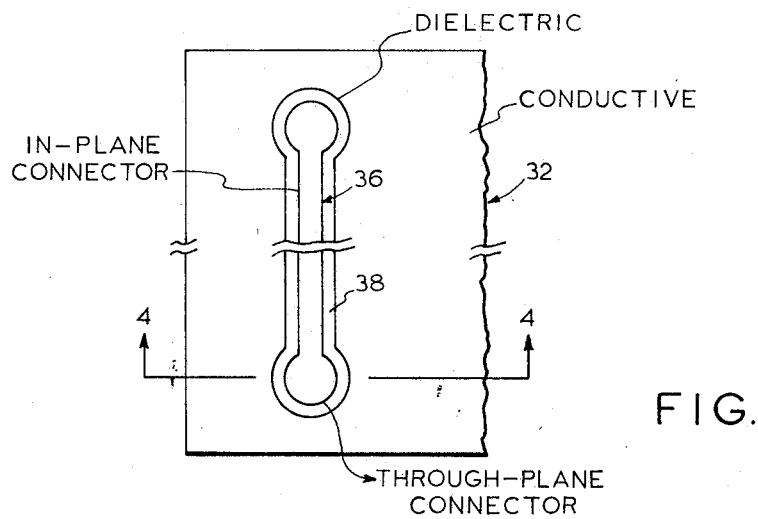
FIG. 3 is a fragmentary sectional view taken substantially along the plane 3—3 of FIG. 2(a)
Figure 4:
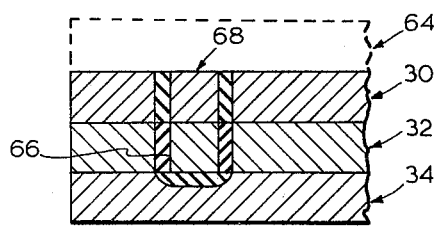
FIG. 4 is a fragmentary sectional view taken substantially along the plane 4—4 of FIG. 3.

Attention is now called to FIGS. 3 and 4 which better illustrate the conductor 36 as being elongated in the plane of plate 32. It will also be noted that the conductor 36 is insulated along its length from the rest of plate 32 by the dielectric material 38 supported in an endless channel surrounding the conductive island 36.

In order to interconnect the in-plane connector 36 of FIG. 3 to conductors disposed between other plates, e.g. between plates 30 and 64, the conductor 36 may be connected to a through-plane connector 66 shown in FIG. 4. The connector 66 makes electrical contact with a corresponding connection 68 extending through plate 30 to plate 64. Through-plane connectors of this type are disclosed in U.S. patent application Ser. No. 613,652 filed on Feb. 2, 1967 by Howard L. Parks and assigned to the same assignee as the present application. Thus it should be appreciated that the structure of FIGS. 2–4 is useful for providing coaxial transmission line-like interconnections in a single plane which can be extended to other planes by through-plane connectors 66 and 68.

A preferred method of fabricating embodiments of the present invention is illustrated by FIG. 5 which demonstrates how three different types of conductors are formed. The first conductor type 72 shown in FIG. 5(f) has top and bottom surfaces which substantially coincide with the top and bottom surfaces of the plate within which it is contained. A second type of conductor 74 is also illustrated in FIG. 5(f) and is characterized by one surface (herein the top surface) being substantially coincident with the corresponding surface of the plate but with the other surface being spaced from the plate surface by dielectric material 76. The third type of central conductor 78 is also illustrated in FIG. 5(f) and differs from the conductor 72 in that its top and bottom surfaces have been contoured to effectively position them below the corresponding plate surfaces. Thus, the conductor 78 can be encapsulated in dielectric material 80 to prevent electrical interconnection with conductive plates disposed above and beneath.

A typical conductive plate for carrying the central conductors 72, 74, 78 may have a thickness dimension of approximately 10 mils. The dimensions of the central conductors 72, 74, 78 are dependent upon their intended function. Thus if they are to function as mounting pads and need to carry high level currents, they can be relatively wide, e.g. from 15 to 100 mils. More typically, the conductors will carry low level currents and thus may have cross-sectional dimensions of from 2–4 mils wide and 1–10 mils thick. A conductor having a cross-sectional area of 1 square mil can carry maximum current of approximately 200 milliamperes.

The conductors of FIG. 5(f) are fabricated in accordance with a preferred method of the invention by starting out with the conductive plate 82 shown in FIG. 5(a), which may be of copper or aluminum, for example. The thickness of the plate 82 will depend upon the desired thickness of the conductor lines. The plate should of course be provided with an appropriate border area and with registry holes which enable it to be properly aligned for production of art work for photofabrication processing. Endless elongated troughs 84 are formed in the top surface of the plate 82 as by initially completely covering the top surface with a photo resist and exposing all areas other than the trough areas. The exposed areas thus become etch resistant. The troughs are then chemically etched, e.g. with ferric chloride etchant. The troughs should preferably be etched to a depth slightly greater than one-half the board thickness. The resist can then be completely stripped with a suitable solvent and the plate surface subsequently cleaned. The troughs 84 are then filled with dielectric material 86 as shown in FIG. 5(c) and then cured by the application of heat. The excess dielectric material is then removed, as by sanding. An identical photo resist technique can then be used to etch troughs 90 in the bottom surface of the board 82. The troughs 90 are then filled with dielectric material 92 to thus yield the three conductors 72, 74, 78A shown in FIG. 5(e). Both surfaces of the plate are then again covered with photo resist material and the entire plate exposed except for the top and bottom of surfaces of the conductor 78A. The surfaces of the conductor 78A are then etched and subsequently filled with dielectric material to yield the conductor 78 of FIG. 5(f).

FIGS. 6, 7, and 8 respectively illustrate side sectional views of the conductors 72, 74 and 78. The conductor 72 is used in special applications where reasonably high currents are to be carried and isolation to conductive layers above and below is not required. The conductor 74 shown in FIG. 7 may have a larger cross-sectional area and thus can be used for higher current loads where electrical isolation is needed from only one level. Conductor 78 of FIG. 8 is used for low level currents where isolation from both sides is required. FIGS. 6–8 illustrate through-plane connectors 94 connected to the in-plane connectors 72, 74, 78.

It has been pointed out in FIGS. 2(a) and (b) that coaxial transmission lines can be formed by sandwiching the plate 82 of FIG. 5 between upper and lower conductive plates which in conjunction with the material of the plate 82 substantially envelop a conductor formed in the plate 82. Attention is now called to FIG. 9, however, which illustrates, as an example, how the plate 82 of FIG. 5 can be further processed to yield a coaxial transmission line without utilizing separate top and bottom plates. The method steps of FIG. 9 call for the plate 82, e.g. as shown in FIG. 8, to be plated on both its top and bottom surfaces with conductive layers 100 and 102 of copper, for example. Such plating may be comprised of an initial electroless copper layer and a subsequent electroplated copper layer. Photo resist material is then applied to the surfaces 100 and 102 and the surfaces are completely exposed to make them etch resistant except for isolation areas 104. The layers are then etched to yield conductive studs 106 which are electrically connected to the connector 94. The areas 104 are then filled with dielectric material 108. It will be noted in FIG. 9(c) that the conductor 78 will thus be substantially enveloped by conductor material including the adjacent portions of plate 82 from which the conductor 78 was formed, and the portions of layers 100 and 102 deposited on the plate 82.

From the foregoing, it should be appreciated that planar circuit structures have been shown herein which exhibit electrical characteristics substantially equivalent to characteristics exhibited by conventional coaxial transmission lines. The embodiments of the invention all employ a central conductor supported by dielectric material disposed within an opening extending through a conductive plate which conductor preferably comprises a segment formed from the plate in which it is supported. Although some of the embodiments shown herein are described as being comprised of three superposed plates, it is pointed out that each of these plates could in fact comprise a laminate formed of several layers appropriately bonded together.

The embodiments of the invention in which an exclusive property or privilege is claimed are defined as follows:

1. A method of forming an electrical circuit structure including an elongated electrical conductor, said method comprising the steps of:
   removing material from a conductive plate to form an elongated endless trough extending into said plate from a first surface thereof;
   placing dielectric material in said trough; and
   removing material from a second surface of said plate opposite to said first surface sufficient to bare said dielectric material in said trough whereby an elongated conductive island is defined electrically insulated from the remainder of said plate.

2. The method of claim 1 including the further step of placing dielectric material in place of the material removed from said second surface.

3. The method of claim 1 including the further step of removing material from at least one surface of said island to thus recess it with respect to the corresponding surface of said plate.

4. The method of claim 1 including the further method step of providing a conductive layer on at least one surface of said plate electrically insulated from said island but electrically connected to the remainder of said plate.

5. The method of claim 1 including the further step of removing material from first and second surfaces of said island to thus recess the island with respect to both surfaces of said plate.

6. The method of claim 5 including the further step of providing a conductive layer on each of said first and second surfaces electrically insulated from said island and electrically connected to said plate for providing substantially complete peripheral shielding of said island.

References Cited

UNITED STATES PATENTS

| | | | |
|---|---|---|---|
| 3,193,789 | 7/1965 | Brown | 174—68.5 XR |
| 3,217,089 | 11/1965 | Beck | 174—68.5 |
| 3,351,816 | 7/1967 | Sear et al. | 174—36 XR |
| 3,391,454 | 7/1968 | Reimann et al. | 174—68.5 XR |

DARRELL L. CLAY, Primary Examiner

U.S. Cl. X.R.

156—3; 174—68.5; 317—101